United States Patent
Hamada et al.

(10) Patent No.: US 8,920,016 B2
(45) Date of Patent: Dec. 30, 2014

(54) DISPLAY MEMBER AND DISPLAY DEVICE

(75) Inventors: Kazunari Hamada, Niigata (JP); Sadao Yabe, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 165 days.

(21) Appl. No.: 13/696,222

(22) PCT Filed: Apr. 15, 2011

(86) PCT No.: PCT/JP2011/059347
§ 371 (c)(1),
(2), (4) Date: Nov. 5, 2012

(87) PCT Pub. No.: WO2011/142209
PCT Pub. Date: Nov. 17, 2011

(65) Prior Publication Data
US 2013/0058131 A1 Mar. 7, 2013

(30) Foreign Application Priority Data
May 12, 2010 (JP) .................. 2010-110608

(51) Int. Cl.
*F21V 8/00* (2006.01)
*G09F 13/06* (2006.01)
*G09F 13/18* (2006.01)
*G01D 11/28* (2006.01)

(52) U.S. Cl.
CPC ............. *G02B 6/006* (2013.01); *G09F 13/06* (2013.01); *G09F 13/18* (2013.01); *G02B 6/0036* (2013.01); *G02B 6/0055* (2013.01); *G01D 11/28* (2013.01)
USPC ............................ 362/613; 362/611; 362/615

(58) Field of Classification Search
None
See application file for complete search history.

(56) References Cited

U.S. PATENT DOCUMENTS

| | | | |
|---|---|---|---|
| 2004/0223100 A1* | 11/2004 | Kotchick et al. | 349/114 |
| 2006/0239629 A1* | 10/2006 | Qi et al. | 385/146 |
| 2010/0085510 A1* | 4/2010 | Okuyama et al. | 349/65 |
| 2010/0195021 A1* | 8/2010 | Takata | 349/64 |
| 2010/0265438 A1* | 10/2010 | Misono et al. | 349/96 |
| 2010/0315833 A1* | 12/2010 | Holman et al. | 362/607 |

FOREIGN PATENT DOCUMENTS

| | | |
|---|---|---|
| JP | 51-073445 A | 6/1976 |
| JP | 52-087046 A | 7/1977 |
| JP | 59-094386 U | 6/1984 |
| JP | 1-101286 | 7/1989 |
| JP | 04-232906 A | 8/1992 |
| JP | 10-177351 A | 6/1998 |
| JP | 2001-022300 A | 1/2001 |
| JP | 3147000 U | 12/2008 |

OTHER PUBLICATIONS

International Search Report issued in International Patent Application No. PCT/JP2011/059347 dated Jun. 14, 2011.

* cited by examiner

*Primary Examiner* — Ashok Patel
(74) *Attorney, Agent, or Firm* — McDermott Will & Emery LLP (57) ABSTRACT

Provided are a display member and a display device capable of outputting bright and highly uniform light. Provided is a display member (10) comprising a light guiding member (11) which guides light outputted from a first light source (20); a light spreading part (13) which is provided on at least one side surface of the light guiding member (11) and spreads the light guided by the light guiding member (11); a design display part (12) which is provided on at least one surface side of the light guiding member (11) and displays a design; wherein the design display part (12) is provided with a first light transmissive outputting part (122) which transmits and outputs light that was spread by the light spreading part (13) and the light spreading part (13) is provided so as to correspond with the first light transmissive outputting part (122).

8 Claims, 12 Drawing Sheets

DISPLAY MEMBER AND DISPLAY DEVICE

RELATED APPLICATIONS

This application is the U.S. National Phase under 35 U.S.C. §371 of International Application No. PCT/JP2011/059347, filed on Apr. 15, 2011, which in turn claims the benefit of Japanese Application No. 2010-110608, filed on May 12, 2010, the disclosures of which Applications are incorporated by reference herein.

TECHNICAL FIELD

The present invention relates to a display member and a display device.

BACKGROUND ART

As such a technology, for example, Patent Literatures 1 to 3 disclose a light guiding member provided with a sheet-like member having flexibility and light transmissive property and low refractive index portions arranged on both surfaces of the sheet-like member and having a refractive index of light lower than that of the sheet-like member.

CITATION LIST

Patent Literature

[PTL 1] Japanese Unexamined Patent Application Publication No. S51-73445
[PTL 2] Japanese Unexamined Patent Application Publication No. S52-87046
[PTL 3] Japanese Unexamined Patent Application Publication No. H04-232906

SUMMARY OF INVENTION

Technical Problem

However, there is a problem that since the light guiding member disclosed in Patent Literatures 1 to 3 does not consider a design illuminated by light guided and outputted by the light guiding member, when a predetermined design is illuminated by the light guiding member, it is not possible to efficiently illuminate the design.

Therefore, the present invention has been achieved in view of the above-described problems, and an object thereof is to provide a display member and a display device, by which it is possible to efficiently illuminate a design.

Solution to Problem

A display member according to a first aspect of the present invention includes:
a light guiding member for guiding light outputted from a first light source;
a light spreading portion for spreading the light guided by the light guiding member, the light spreading portion being provided on at least one of the surface and the rear surface of the light guiding member; and
a design display portion for displaying a design, the design display portion being provided on at least one of the surface side and the rear surface side of the light guiding member, wherein
the design display portion includes: a first light transmissive outputting portion for transmitting and outputting the light spread by the light spreading portion, and
the light spreading portion is provided to correspond to the first light transmissive outputting portion.

Furthermore, a display device according to a second aspect of the present invention includes:
a first light source;
a light guiding member for guiding light outputted from the first light source;
a light spreading portion for spreading the light guided by the light guiding member, the light spreading portion being provided on at least one of the surface and the rear surface of the light guiding member; and
a design display portion for displaying a design, the design display portion being provided on at least one of the surface side and the rear surface side of the light guiding member, wherein
the design display portion includes: a first light transmissive outputting portion for transmitting and outputting the light spread by the light spreading portion, and
the light spreading portion is provided to correspond to the first light transmissive outputting portion.

Advantageous Effects of Invention

In accordance with the display member and the display device according to the present invention, since the design display portion is provided with the first light transmissive outputting portion for transmitting the light spread by the light spreading portion and the light spreading portion is arranged in an area corresponding to the first light transmissive outputting portion, output of light from an unnecessary part of the light guiding member is prevented or reduced, so that it is possible to efficiently illuminate the design displayed by the design display portion.

BRIEF DESCRIPTION OF DRAWINGS

[FIG. 1]

[FIG. 2]

[FIG. 3]

[FIG. 4]

[FIG. 5]

[FIG. 6] FIG. 6($a$) is a schematic sectional view of a display member according to a modification of the present invention, which has a light spreading portion arranged in an area corresponding to an area including a design portion, and FIG. 6($b$) is a schematic sectional view of a display member according to another modification of the present invention, which has a light spreading portion arranged in an area corresponding to an area not including a design portion (other than the design portion).

[FIG. 7] FIG. 7($a$) is a diagram illustrating a state in which light is outputted from a first light transmissive outputting portion of the design display portion illustrated in FIG. 6($a$), and FIG. 7($b$) is a diagram illustrating a state in which light is outputted from a first light transmissive outputting portion of the design display portion illustrated in FIG. 6(b).

[FIG. 8]

[FIG. 9]

[FIG. 10] FIG. 10 is a diagram illustrating a display member according to another modification of the present invention, wherein FIG. 10(a) is a diagram illustrating an example of a light spreading portion provided with a high refractive index portion, and FIG. 10(b) is a diagram illustrating another example of the light spreading portion provided with the high refractive index portion.

[FIG. 11]

[FIG. 12]

[FIG. 13]

[FIG. 14]

[FIG. 15]

[FIG. 16]

[FIG. 17]

[FIG. 18]

[FIG. 19]

[FIG. 20]

[FIG. 21]

DESCRIPTION OF EMBODIMENTS

Figure 1:
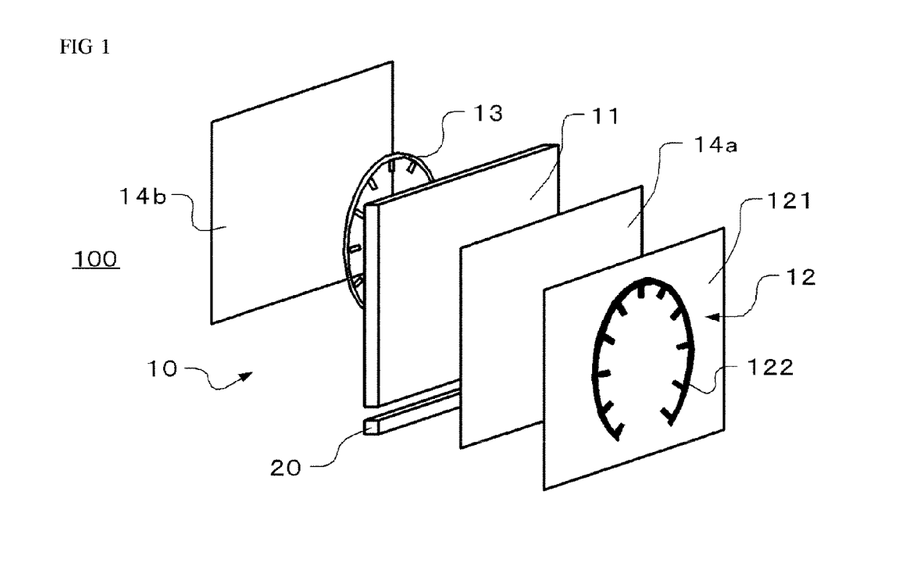
FIG. 1 is an exploded perspective view of a display device according to an embodiment of the present invention.
Figure 2:
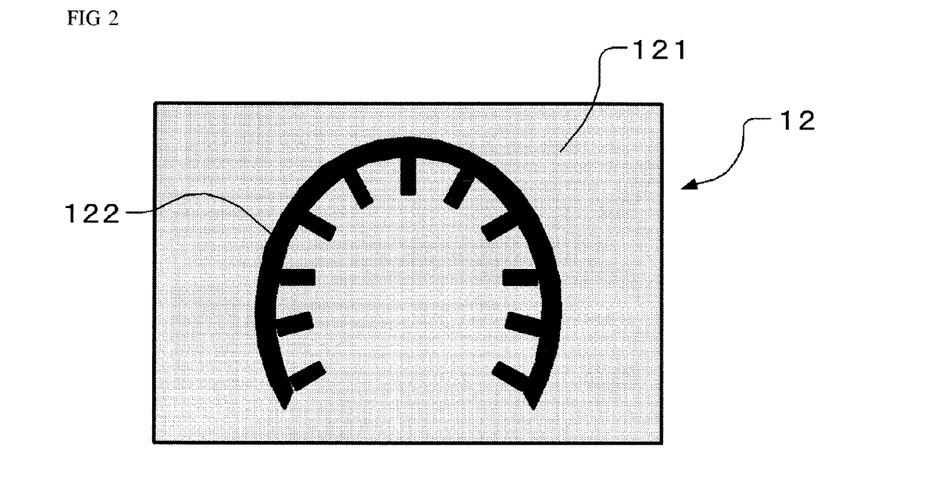
FIG. 2 is a plan view when a design display portion according to the embodiment of the present invention is viewed from the front.
Figure 3:
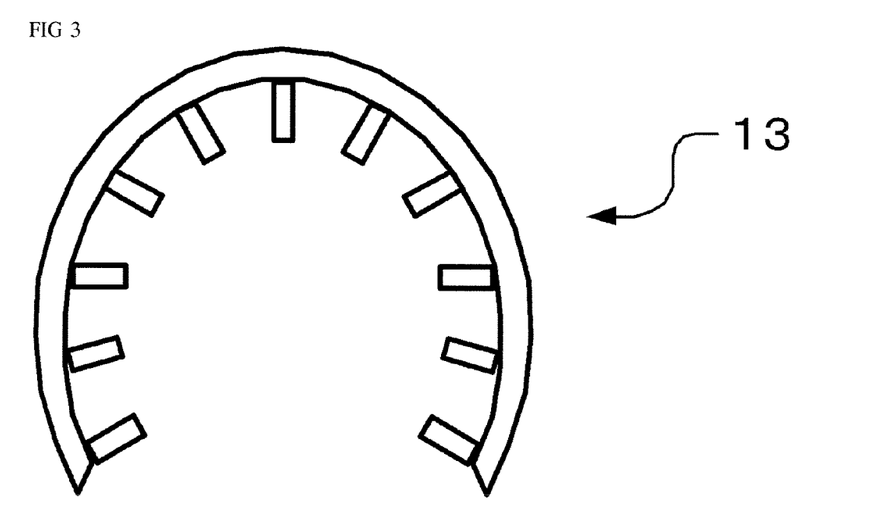
FIG. 3 is a plan view when a light spreading portion according to the embodiment of the present invention is viewed from the front.

Hereinafter, a display member and a display device according to an embodiment of the present invention will be described based on FIG. 1 to FIG. 3.

A display device 100 includes a display member 10 that displays a predetermined design, and a first light source 20 that outputs light.

In the display device 100, the light outputted from the first light source 20 is received in an end portion of the display member 10, and is outputted from a predetermined area of the display member 10. Specifically, the display device 100, for example, is used in a vehicle meter, a cellular phone, a display and the like. In the present embodiment, the display device 100 is used in the vehicle meter.

The first light source 20 is a rod-like light source that straightly outputs light, and is provided to allow the outputted light to be incident into the display member 10 (a light guiding member 11 which will be described later). Specifically, the first light source 20, for example, is provided such that a light outputting portion of the first light source 20 faces the side surface of the display member 10 (the light guiding member 11 which will be described later). The light outputted from the first light source 20 is incident into the light guiding member 11 from the side surface of the light guiding member 11 which will be described later. The first light source 20, for example, includes a light emitting element such as a cold cathode tube, a light emitting diode, or an organic EL element.

The display member 10 includes the light guiding member 11, a design display portion 12, a light spreading portion 13, a first low refractive index portion 14a, and a second low refractive index portion 14b.

The light guiding member 11 guides the light outputted from the first light source 20. Here, the light guiding member 11 is a member (for example, a polycarbonate plate) made of flat-like synthetic resin having a light transmissive property (including a light translucent property) such as transparency and translucency. Specifically, the light guiding member 11 is formed using polycarbonate-based resin (a refractive index of light is about 1.6), acryl-based resin (a refractive index of light is about 1.49), silicon-based resin (a refractive index of light is about 1.5), and the like. The light guiding member 11 receives light, which is outputted from the first light source 20, at a side (a surface facing the first light source 20) thereof, and guides the received light (the light incident from the side to the inside).

The design display portion 12 is provided at a side of a surface 111 of the light guiding member 11. The design display portion 12, for example, is formed by printing, coating and the like using ink and the like, and serves as a display layer for displaying a design. The design display portion 12 is provided with a design portion 121 that represents a design for expressing a character, a picture, a diagram, a symbol and the like. Moreover, the design display portion 12 is provided at a part thereof with a first light transmissive outputting portion 122 that transmits and outputs light spread by a light spreading portion 13 which will be described later. When the design display portion 12 is illuminated, the design display portion 12 displays a predetermined design by the design portion 121 and the first light transmissive outputting portion 122. The design portion 121 forms a design, which is obtained by cutting out a part of "an index portion of a vehicle meter (a speedometer)", using a non-light transmissive (a light blocking) layer. The design display portion 12 is provided at a part thereof with a light transmissive area by a material, which is used in the arrangement of the design portion 121 or the design portion 121, and the like, and the first light transmissive outputting portion 122 is provided in at least a part of the area as an actual light transmissive area of the area. That is, the design display portion 12 is divided into an area through which light is actually outputted, and an area through which light is not outputted. The light outputting area is only the first light transmissive outputting portion 122 provided at a partial area of the design display portion 12. Meanwhile, an area from which light is not outputted (the light non-outputting area) corresponds to an area where the light-blocking design portion 121 is provided, an area of the light transmissive area, where the light spread by the light spreading portion 13 is not outputted because the light does not reach the design display portion 12, and the like. In this way, in the light guiding member 11, output of light from an unnecessary part of the light guiding member 11 is prevented or reduced, so that it is possible to efficiently illuminate the design displayed by the design display portion 12. In FIG. 1 and FIG. 2, the first light transmissive outputting portion 122 is a through hole (may be appropriately changed to a notch, and hereinafter, which is the same for a through hole) formed in a part of the index portion of the speedmeter. Here, the first light transmissive outputting portion 122 is formed by cutout picture printing and the like. Furthermore, since it is sufficient if the first light transmissive outputting portion 122 allows the light spread by the light spreading portion 13 to pass therethrough, the first light transmissive outputting portion 122 is formed, for example, by white printing having light transmissive property.

The light spreading portion 13 is provided on the rear surface 112 of the light guiding member 11. The light spreading portion 13 spreads the light guided by the light guiding member 11. The light spread by the light spreading portion 13 passes through the first light transmissive outputting portion 122 and is outputted from the first light transmissive outputting portion 122. The light spreading portion 13 is formed on the rear surface 112 of the light guiding member 11 by printing, coating and the like using a light spreading material. The light spreading portion 13 is provided in an area corresponding to the first light transmissive outputting portion 122 of the design display portion 12. For example, at least a part (here, the whole) of the light spreading portion 13 is provided to overlap the whole of the first light transmissive outputting portion 122 when viewed from the normal direction (that is, here, the normal direction with respect to the surface of the light spreading portion 13) on the surface of the design display portion 12 (when viewed from the top, as viewed in FIG. 4).

Here, the light spreading portion 13 is a light spreading film (sheet)-like member, and is provided to correspond to the first light transmissive outputting portion 122 of the rear surface 112 of the light guiding member 11. Furthermore, the light spreading portion 13 is provided at approximately the same position as that of the first light transmissive outputting portion 122 with approximately the same shape as that of the first light transmissive outputting portion 122. With such a configuration, it is possible to provide the light spreading portion 13 without a complicated design. In addition, the spreading described herein appropriately includes a change in the course of light due to diffused reflection, scattering, refraction, reflection and the like.

Figure 4:
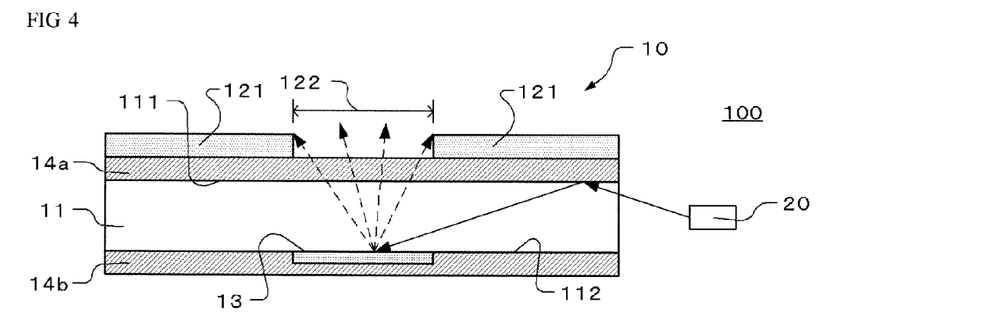
FIG. 4 is a schematic sectional view of a display member according to the embodiment of the present invention.
Figure 8:
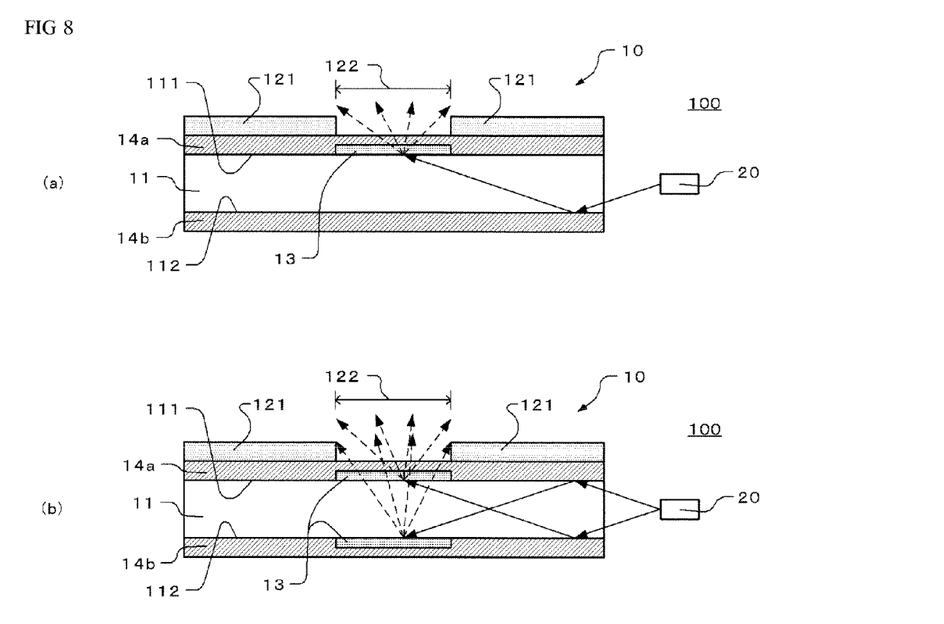
FIG. 8(a) is a schematic sectional view of a display member according to another modification of the present invention, which has a light spreading portion arranged on a surface of a light guiding member.
FIG. 8(b) is a schematic sectional view of a display member according to another modification of the present invention, which has light spreading portions arranged on both surfaces of a light guiding member.

Furthermore, the spreading property of the light spreading portion 13 is appropriately changed according to a positional relation between the first light transmissive outputting portion 122 and the light guiding member 11. For example, as illustrated in FIG. 4, when the design display portion 12 is positioned at the side of the surface 111 of the light guiding member 11 and the light spreading portion 13 is formed on the rear surface 112 of the light guiding member 11, the light spreading portion 13 mainly spreads light by reflection, diffused reflection, scattering and the like. Furthermore, for example, as illustrated in FIG. 8(a), when the design display portion 12 is positioned at the side of the surface 111 of the light guiding member 11 and the light spreading portion 13 is formed on the surface 111 of the light guiding member 11, the light spreading portion 13 mainly spreads light by scattering, refraction and the like. As described above, the spreading property of the light spreading portion 13 is changed according to whether light to be spread is allowed to travel toward the surface or the rear surface (or including both directions). In addition, when the light to be spread is allowed to travel in both directions of the surface or the rear surface, the light spreading portion 13 appropriately performs diffused reflection, scattering, refraction, reflection and the like.

The first low refractive index portion 14a and the second low refractive index portion 14b are provided to cover both surfaces 111 and 112 (appropriately, including the light spreading portion 13) of the light guiding member 11 throughout the whole of the both surfaces 111 and 112 of the light guiding member 11 while interposing the light guiding member 11 therebetween. The first low refractive index portion 14a and the second low refractive index portion 14b have a light transmissive property (including a light translucent property) such as transparency and translucency, and have a refractive index of light lower than that of the light guiding member 11. The first low refractive index portion 14a and the second low refractive index portion 14b, for example, are formed by printing, coating and the like using synthetic resin having a refractive index of light lower than that of the light guiding member 11. The first low refractive index portion 14a and the second low refractive index portion 14b may be provided by a member (for example, an acryl plate) made of flat-like synthetic resin having a light transmissive property.

Specifically, the first low refractive index portion 14a and the second low refractive index portion 14b are formed by acryl-based resin (a refractive index of light is about 1.49), silicon-based resin (a refractive index of light is about 1.5), tetrafluoroethylene or polytetrafluoroethylene (a kind of polyethylene, a refractive index of light is about 1.35), and the like. In addition, the first low refractive index portion 14a and the second low refractive index portion 14b may be formed by materials different from each other.

At an interface between the first low refractive index portion 14a and the light guiding member 11 or an interface between the second low refractive index portion 14b and the light guiding member 11, the light guided by the light guiding member 11 is totally reflected. The total reflection is a phenomenon that when light is allowed to be incident from a medium (the light guiding member 11) having a large refractive index to media (the low refractive index portions 14a and 14b) having a small refractive index, the whole (appropriately including approximately the whole) of the light to be incident is reflected without passing through the interface. The total reflection occurs when an incidence angle of light is larger than an angle (a critical angle) determined by each refractive index of adjacent media (here, the light guiding member 11, the first low refractive index portion 14a, and the second low refractive index portion 14b). Since most of light incident from a side surface of the light guiding member 11 reaches the first low refractive index portion 14a or the second low refractive index portion 14b at an incidence angle larger than the critical angle, light having reached at the interface between the light guiding member 11 and the low refractive index portion 14 is totally reflected.

Figure 5:
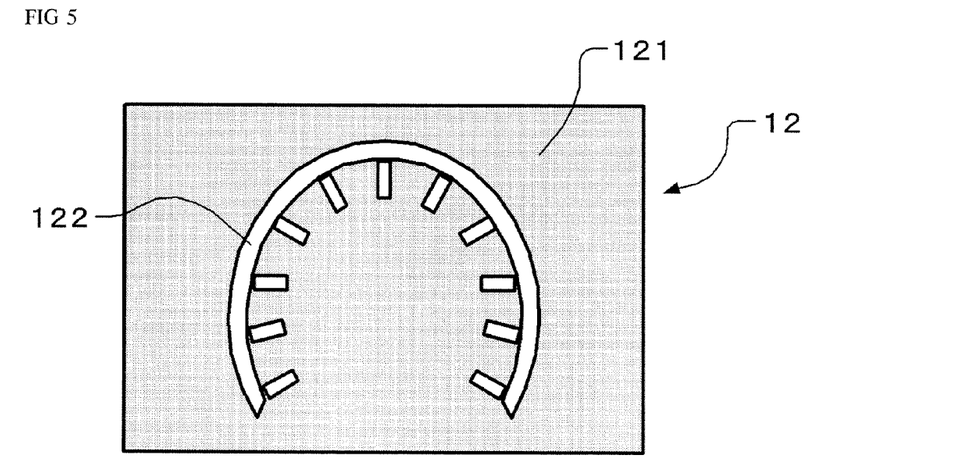
FIG. 5 is a diagram illustrating a state in which light is outputted from a first light transmissive outputting portion of the design display portion according to the embodiment of the present invention.

In the display device 100 configured as above, as illustrated in FIG. 4, the light outputted from the first light source 20 is incident into the side surface of the light guiding member 11 of the display member 10. The light incident into the light guiding member 11 is repeatedly totally reflected at the interface between the light guiding member 11 and the first low refractive index portion 14a or at the interface between the light guiding member 11 and the second low refractive index portion 14b, and travels the inside of the light guiding member 11. In this way, the light guiding member 11 guides the light outputted from the first light source 20. In addition, a straight arrow illustrated in FIG. 4 represents the direction of the light traveling the inside of the light guiding member 11. A part of the light traveling the inside of the light guiding member 11 reaches the light spreading portion 13. The light having reached the light spreading portion 13 is spread by the light spreading portion 13. In addition, dotted arrows illustrated in FIG. 4 represent the traveling directions of the light spread by the light spreading portion 13. Of the light spread by the light spreading portion 13, light having an incidence angle to the surface 111 of the light guiding member 11, which is smaller than the critical angle, passes through the first light transmissive outputting portion 122 (here, the through hole) of the design display portion 12 through the first low refractive index portion 14a without being totally reflected. In this way, in the design display portion 12, the light is outputted from the first light transmissive outputting portion 122 (here, the part of the index portion of the speedometer) formed by the through hole as illustrated in FIG. 5. Consequently, the design portion 121 is darkly viewed and the first light transmissive outputting portion 122 is brightly viewed.

So far, in accordance with the display member 10 and the display device 100 according to the present embodiment, since the light spreading portion 13 is provided in an area corresponding to the first light transmissive outputting portion 122 provided as an area through which light actually passes in the design display portion 12, the light spread by the light spreading portion 13 transmits the first light transmissive outputting portion 122 and is outputted. In this way, in the light guiding member 11, output of light from an unnecessary part of the light guiding member 11 is prevented or reduced, so that it is possible to efficiently illuminate the design displayed by the design display portion 12. Particularly, as compared with a conventional case using a display member in which light is outputted from nearly the entire surface of a light guiding member, the luminance (the luminance of the lightened part) of the light outputted from the first light transmissive outputting portion 122 is high, so that it is possible to efficiently illuminate the design displayed by the design display portion 12.

Figure 6:
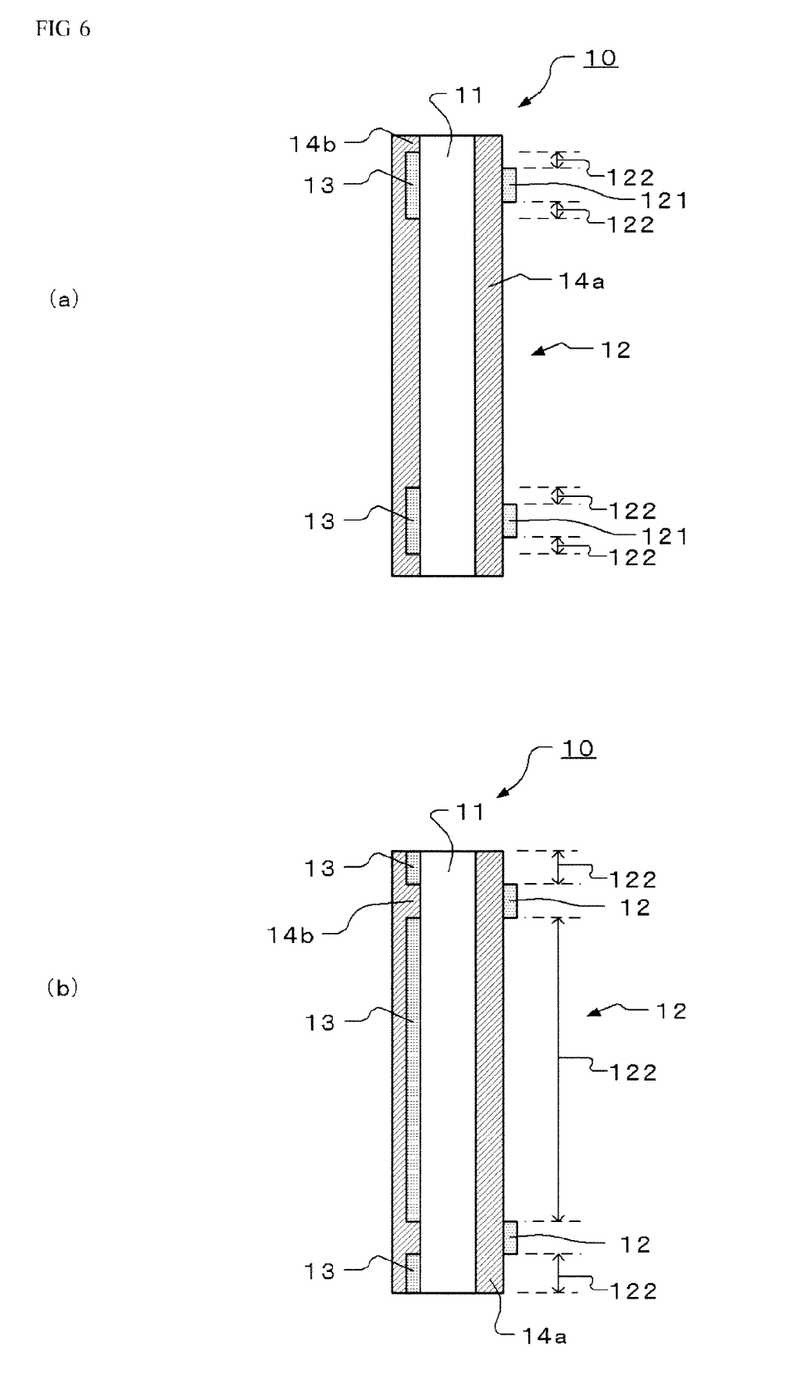
Figure 7:
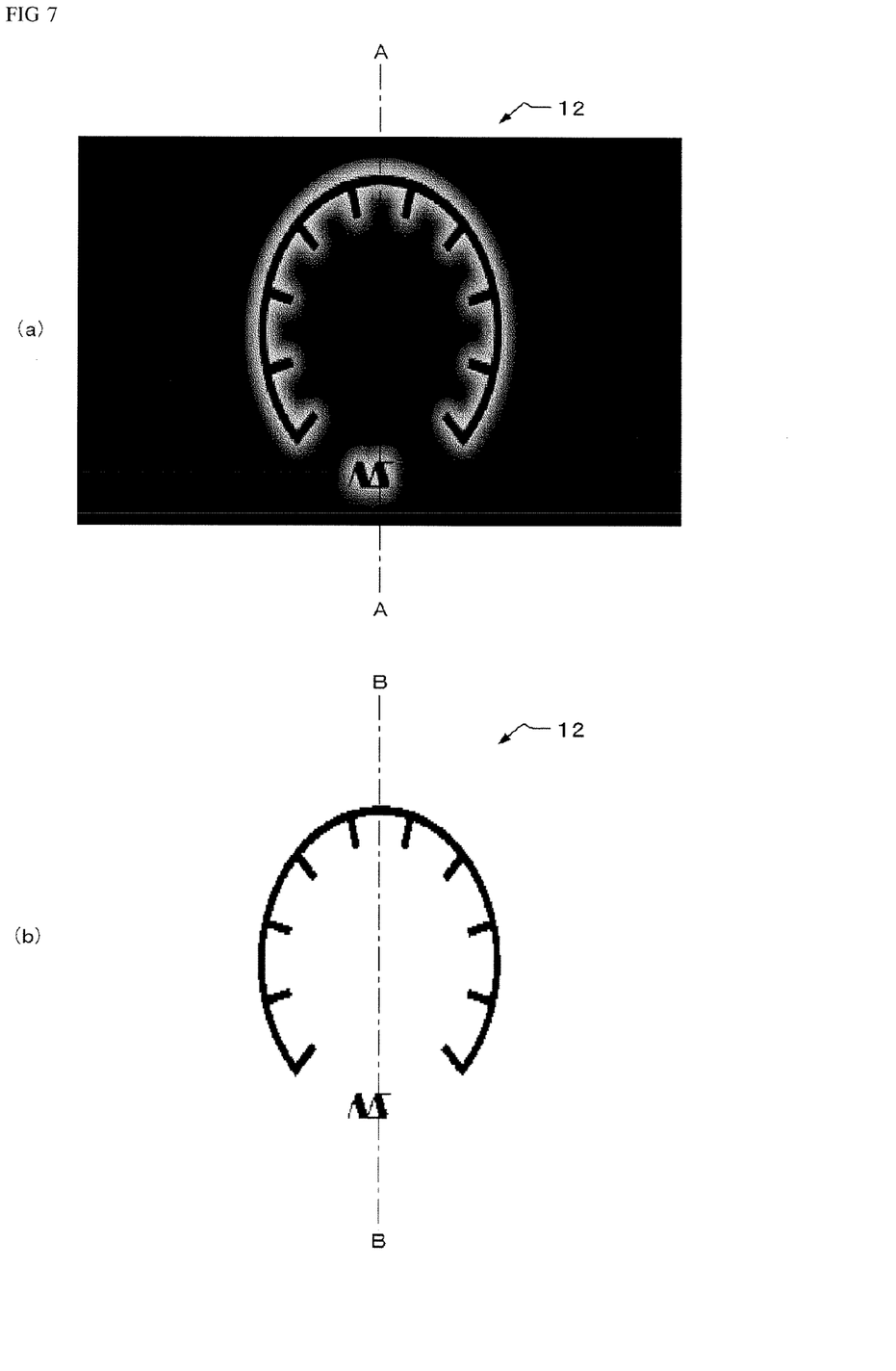

Furthermore, in the embodiment, even when the same design portions 121 are provided in the design display portion 12, the first light transmissive outputting portion 122 is changed and the light spreading portion 13 is provided in an area corresponding to the first light transmissive outputting portion 122, so that it is possible to give a different impression on a person viewing the display device 100 when the design display portion 12 is illuminated. For example, as illustrated in FIG. 6(a) and FIG. 6(b), the design display portion 12 is provided with the same design portions 121, but the first light transmissive outputting portions 122 are provided as different areas and the light spreading portions 13 are provided in areas corresponding to the first light transmissive outputting portions 122, so that it is possible to give a different impression on a person viewing the display device 100 when the design display portion 12 is illuminated as illustrated in FIG. 7(a) and FIG. 7(b) (the same design portions 121 are provided and only the positions of the light spreading portions 13 are different from each other in FIG. 7(a) and FIG. 7(b)).

Furthermore, in the embodiment, the design display portion 12 is provided at the surface side of the light guiding member 11 through the first low refractive index portion 14a. In this way, the light guided by the light guiding member 11 is totally reflected at the interface between the light guiding member 11 and the first low refractive index portion 14a, so that the light is prevented from being absorbed by the design display portion 12. Consequently, the light guiding efficiency of the light guiding member 11 is ensured. That is, when the design display portion 12 is provided on the surface 111 or the rear surface 112 of the light guiding member 11, it is preferable that the design display portion 12 is provided through the first low refractive index portion 14a or the second low refractive index portion 14b.

In addition, even when the first low refractive index portion 14a and the second low refractive index portion 14b are not provided on both surfaces of the light guiding member 11, since the air has a refractive index of light lower than that of the light guiding member 11, the light guided by the light guiding member 11 is totally reflected at the interface between the light guiding member 11 and the air.

However, for example, when a medium (for example, dust) having a refractive index higher than that of the light guiding member 11 has adhered to the surface of the light guiding member 11, or when the surface of the light guiding member 11 has been damaged, light may pass through or may be absorbed at that part, resulting in a reduction of the light guiding efficiency of the light guiding member 11. That is, the first low refractive index portion 14a and the second low refractive index portion 14b are provided respectively on both surfaces of the light guiding member 11, so that light can be nearly totally reflected at the interface between the first low refractive index portion 14a and the light guiding member 11 or at the interface between the second low refractive index portion 14b and the light guiding member 11, resulting in the improvement of the light guiding efficiency, as compared with a case in which the first low refractive index portion 14a and the second low refractive index portion 14b are not provided.

Furthermore, in the embodiment, the light spreading portion 13 is provided close to the light guiding member 11 and then the second low refractive index portion 14b is provided on the light spreading portion 13 (at a lower position, as viewed in FIG. 4). In this way, guided light is spared by the light spreading portion 13.

The contents described in the embodiment are intended for embodying the technology according to the present invention, and do not limit the technical scope of the present invention. The technical contents of the present invention can be variously modified within the scope of the claims. Hereinafter, modifications of the present embodiment will be described with reference to FIG. 6 to FIG. 21. In addition, the technical matters described above or in the following modifications may be appropriately combined with each other.

Furthermore, in the embodiment, the light spreading portion 13 is provided on the rear surface 112 of the light guiding member 11. However, it is sufficient if the light spreading portion 13 is arranged in an area corresponding to the first light transmissive outputting portion 122. As illustrated in FIG. 8(a), the light spreading portion 13 may be provided on the surface 111 of the light guiding member 11, or as illustrated in FIG. 8(b), the light spreading portion 13 may be provided on both surfaces 111 and 112 thereof. In addition, as described above, the property of the light spreading portion 13 may be changed according to the positions thereof.

Figure 9:
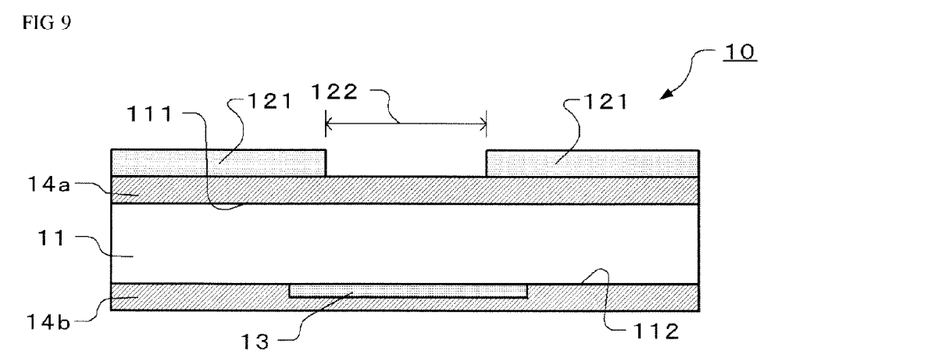
FIG. 9 is a schematic sectional view of a display member according to another modification of the present invention, which has a light spreading portion larger than a first light transmissive outputting portion arranged.

Furthermore, the light spreading portion 13 may be larger than the first light transmissive outputting portion 122. For example, the light spreading portion 13 may have a width wider than that of the first light transmissive outputting portion 122. Furthermore, the light spreading portion 13 may have a shape similar to and be larger than the first light transmissive outputting portion 122. In this way, even when the light spreading portion 13 is provided at a position shifted from the first light transmissive outputting portion 122 (that is, a position out of an area corresponding to the first light transmissive outputting portion 122), it is possible to spread light toward the first light transmissive outputting portion 122 and it is possible for the first light transmissive outputting portion 122 to efficiently output the light spread by the light spreading portion 13.

Furthermore, a viewing angle of the first light transmissive outputting portion 122 (a lightened part) becomes wide.

Figure 10:
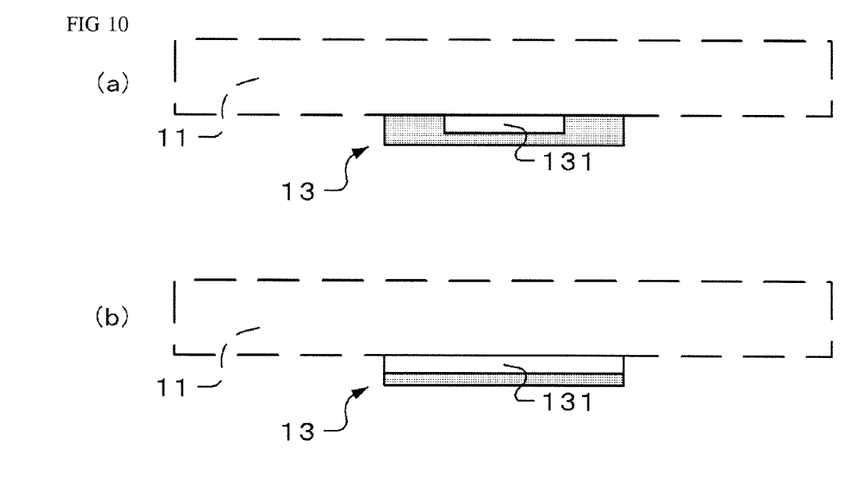
Figure 11:
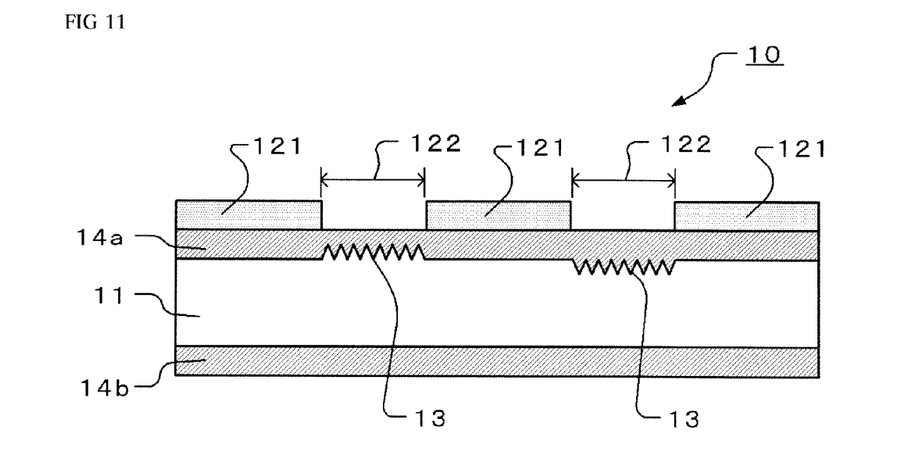
FIG. 11 is a schematic sectional view of a display member according to another modification of the present invention, which has a light spreading portion directly formed in a light guiding member.

Furthermore, the light spreading portion 13 may be provided with a high refractive index portion 131 having a refractive index of light higher than that of the light guiding member 11. When the light spreading portion 13 is viewed from the normal direction with respect to the surface of the light spreading portion 13 (when the light spreading portion 13 is viewed from the top in FIG. 10), the high refractive index portion 131 is provided in an area of at least a part of the light spreading portion 13 as illustrated in FIG. 10(a), or is provided on one surface of the light spreading portion 13 as illustrated in FIG. 10(b). Furthermore, the high refractive index portion 131 is provided to make contact with the surface of the light guiding member 11. In this way, light having reached the light spreading portion 13 passes through (is refracted) at the interface between the light guiding member 11 and the high refractive index portion 131, so that it is possible to increase the amount of the light spread by the light spreading portion 13. Furthermore, the luminance (the luminance of the lightened part) of the light outputted from the first light transmissive outputting portion 122 is higher as compared with the light spreading portion 13 not provided with the high refractive index portion 131, so that it is possible to more efficiently illuminate the design displayed by the design display portion 12. Specifically, the high refractive index portion 131 is formed using polycarbonate-based resin (a refractive index of light is about 1.6), polyurethane-based resin (a refractive index of light is about 1.6), and the like.

Furthermore, it is sufficient if the light spreading portion 13 has a light transmissive property. For example, as illustrated in FIG. 10, the light spreading portion 13 may be obtained by directly forming a dotted pattern and the like, which include a concave-convex part and the like, on the surface of the light guiding member 11 through microdot, imprint, etching and the like. Furthermore, the light spreading portion 13 may be obtained by providing a bubble having a light spreading property on the surface of the light guiding member 11 having a light transmissive property. In these cases, the light spreading portion 13 may be made of the same material as that of the light guiding member 11. Alternatively, the light guiding member 11 and the light spreading portion 13 may be configured by mixing gold powder and the like having a light spreading property into glass having a light transmissive property.

Figure 12:
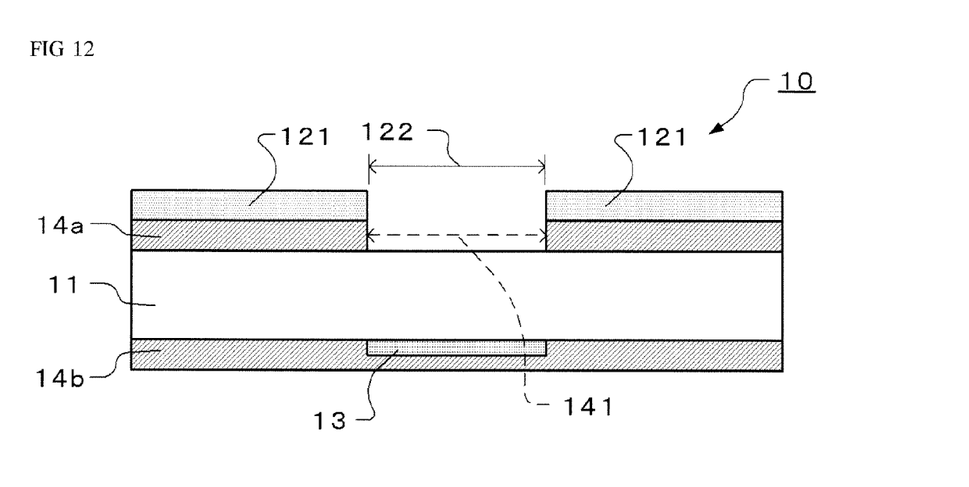
FIG. 12 is a schematic sectional view of a display member according to another modification of the present invention, which has a low refractive index portion arranged in an area corresponding to an area other than a first light transmissive outputting portion.

Furthermore, in the embodiment, the first low refractive index portion 14a and the second low refractive index portion 14b are provided throughout the whole of both surfaces 111 and 112 of the light guiding member 11. However, as illustrated in FIG. 12, the first low refractive index portion 14a may be formed with a through hole 141 at a position through which the light spread by the light spreading portion 13 passes. In this way, the first low refractive index portion 14a and the second low refractive index portion 14b may be provided such that a position corresponding to the first light transmissive outputting portion 122 becomes a through hole.

Figure 13:
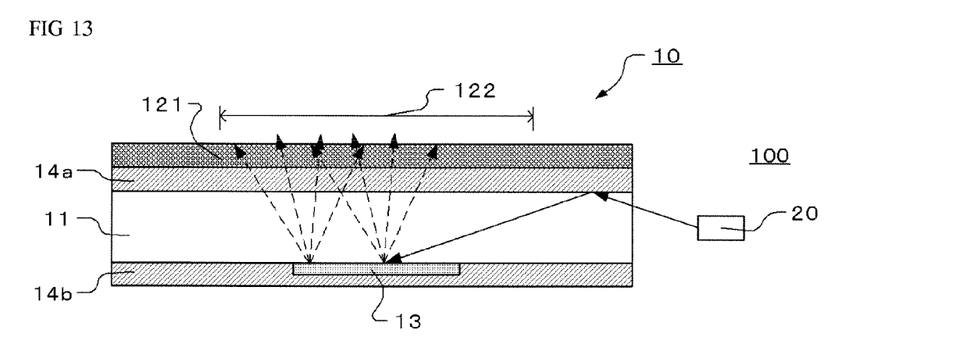
FIG. 13 is a schematic sectional view of a display member according to another modification of the present invention, which has a design portion arranged in an area of a light transmissive outputting portion and having a light transmissive property.

Furthermore, in the embodiment, the design portion 121 formed in the design display portion 12 is a layer having a non-light transmissive property (a light blocking property). However, the design portion 121 may be a layer having a light transmissive property (including a light translucent property). Moreover, the design portion 121 formed using the layer having a light transmissive property may be provided to cover the first light transmissive outputting portion 122 as illustrated in FIG. 13. In such a case, in the design display portion 12, a part, through which the light spread by the light spreading portion 13 passes, is the first light transmissive outputting portion 122 (refer to arrows illustrated in FIG. 13). That is, the first light transmissive outputting portion 122 may be defined by the shape and the like of the light spreading portion 13. In addition, since the range of the first light transmissive outputting portion 122 provided in such a case is a range in which the light spread by the light spreading portion 13 reaches and passes therethrough, the range of the first light transmissive outputting portion 122 becomes wide as compared with the case in which the design portion 121 having a light blocking property in the embodiment is provided (refer to FIG. 5).

Figure 14:
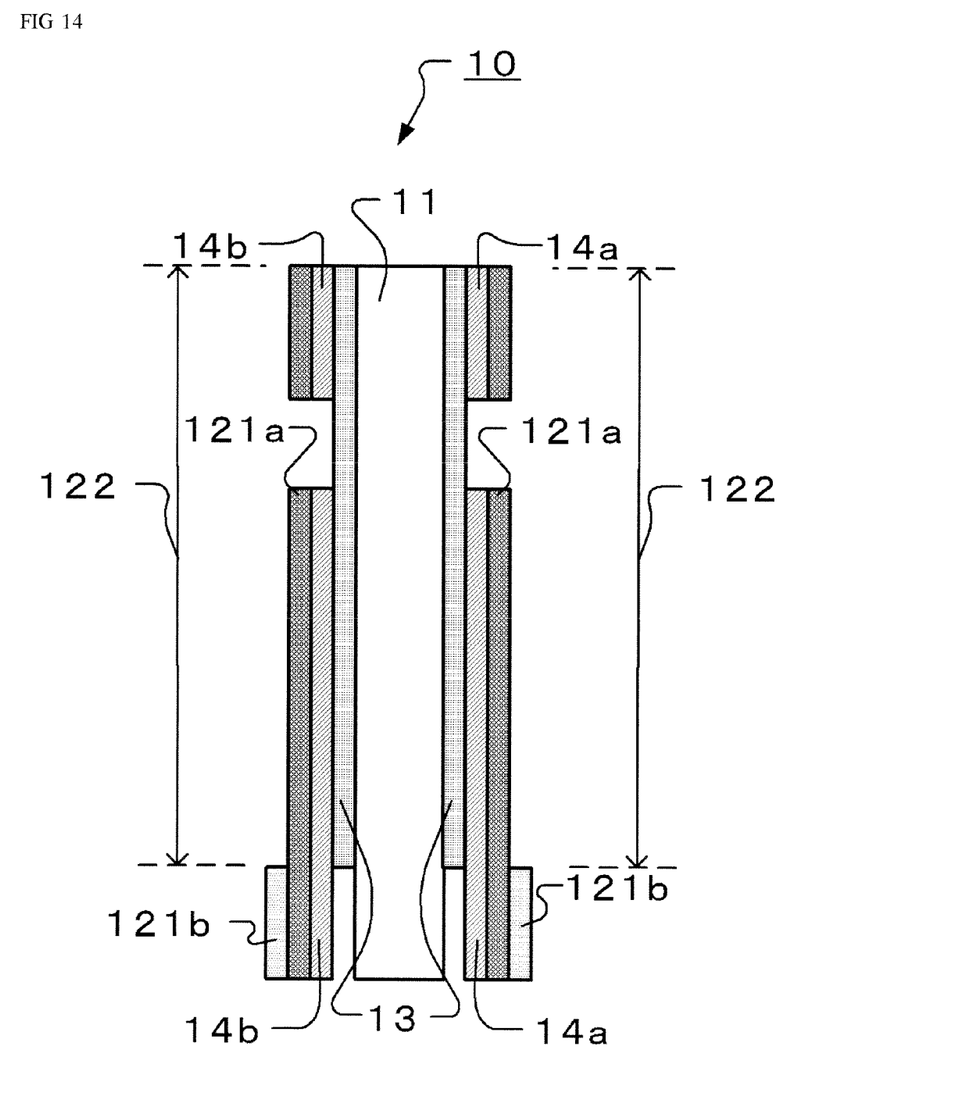
FIG. 14 is a schematic sectional view of a display member according to another modification of the present invention, which is provided with a design display portion on both surface sides of a light guiding member.
Figure 15:
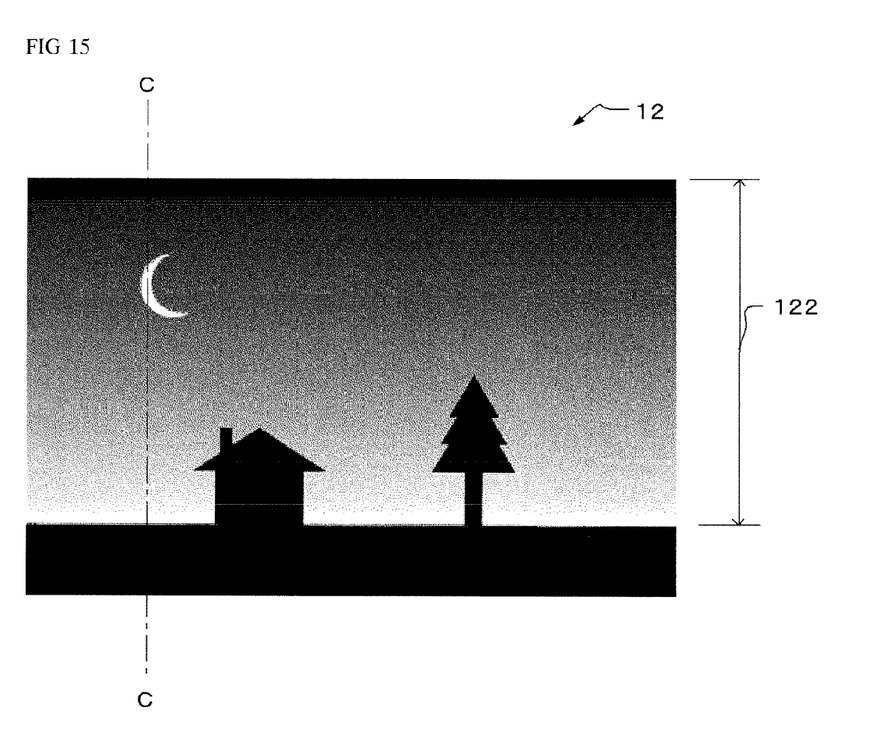
FIG. 15 is a diagram illustrating a state in which light is outputted from a first light transmissive outputting portion of the design display portion illustrated in FIG. 14.

Furthermore, as illustrated in FIG. 14 and FIG. 15, the design display portion 12 may be provided at sides (both surfaces of the display member 10) of both surfaces 111 and 112 of the light guiding member 11, and may display a design by forming a plurality of design portions 121a and 121b. Furthermore, the amount, by which the light spread by the light spreading portion 13 arranged in an area corresponding to the first light transmissive outputting portion 122 provided in the design display portion 12 passes through the first light transmissive outputting portion 122, is adjusted by the design portions 121a formed in the design display portion 12, so that it is possible to display a design formed in the design display portion 12. For example, the design portions 121a are allowed to have gradation and the like, and then the amount, by which light passes through the first light transmissive outputting portion 122, is adjusted. In this way, it is possible to display a fresh design (refer to FIG. 15).

Figure 16:
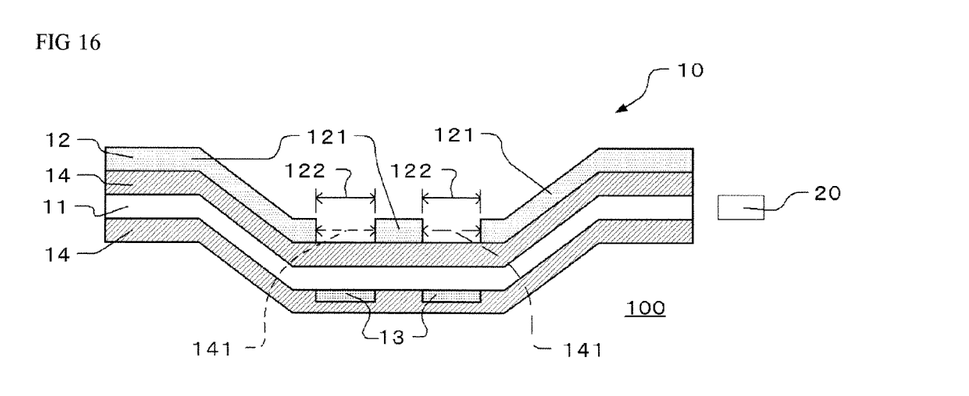
FIG. 16 is a schematic sectional view of a display member according to another modification of the present invention, which illustrates the display member three-dimensionally formed.
Figure 17:
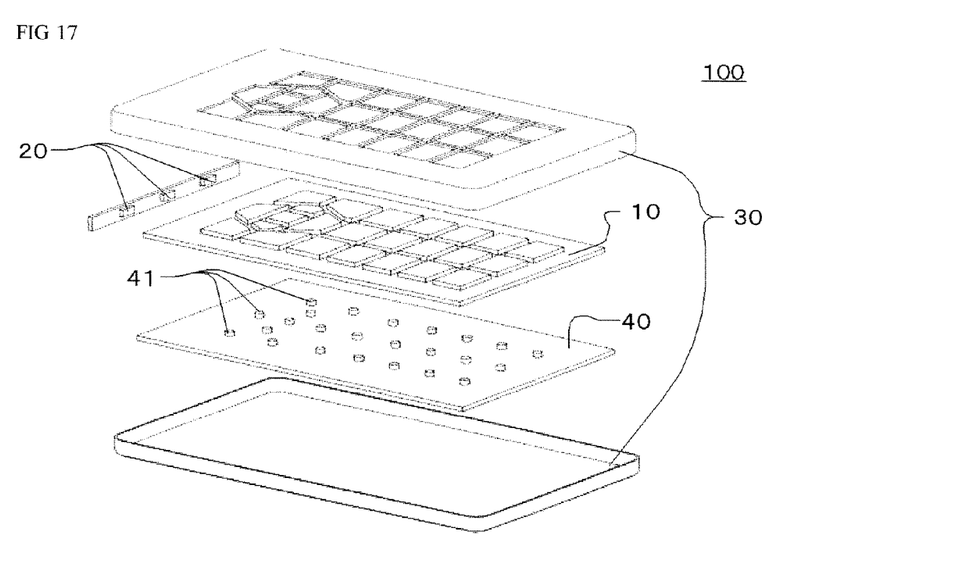
FIG. 17 is an exploded perspective view of a display device according to another modification of the present invention, which is provided with a display member serving as an operation button of a cellular phone.
Figure 18:
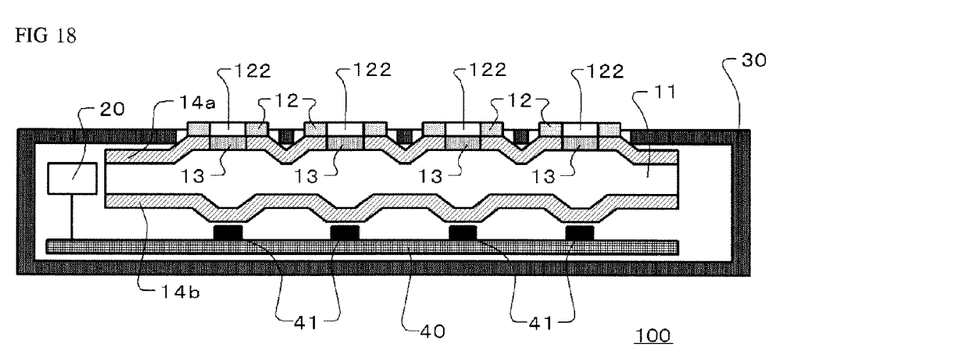
FIG. 18 is a schematic sectional view of the display device illustrated in FIG. 17.

Moreover, in the embodiment, the display member 10 has a flat shape. However, as illustrated in FIG. 16, the display member 10 may be in a three-dimensional shape. For example, the display member 10 may be formed in a three-dimensional shape through air pressure molding, drawing molding and the like. In addition, a three-dimensional light guiding member 11 may be used, and the design display portion 12, the light spreading portion 13, the low refractive index portion 14 and the like may be stacked on the light guiding member 11, thereby configuring a three-dimensional display member 10. Furthermore, for example, as illustrated in FIG. 17 and FIG. 18, a part of the display member 10 may be allowed to have a shape of an operation button of a cellular phone, and the part of the display member 10, the first light source 20, and a circuit board 40 are accommodated in a case body 30, thereby configuring the display device 100 (here, the cellular phone). A switch portion 41 is provided at a position on the circuit board 40, which corresponds to the design portion 12 forming the operation button of the display member 10. When the design portion 12 is pressed, a part of the display member 10 deformed at the pressed portion makes contact with the switch portion 41 and current is applied to the first light source 20 connected to the circuit board 40, so that light is outputted from the first light source 20. In the same manner as above, the light outputted from the first light source 20 travels through the light guiding member 11, is spread by the light spreading portion 13 provided in the display member 10, and then is outputted from the first light transmissive outputting portion 122 provided in the design display portion 12. Consequently, it is possible to efficiently illuminate a design (a design on the operation button).

Figure 19:
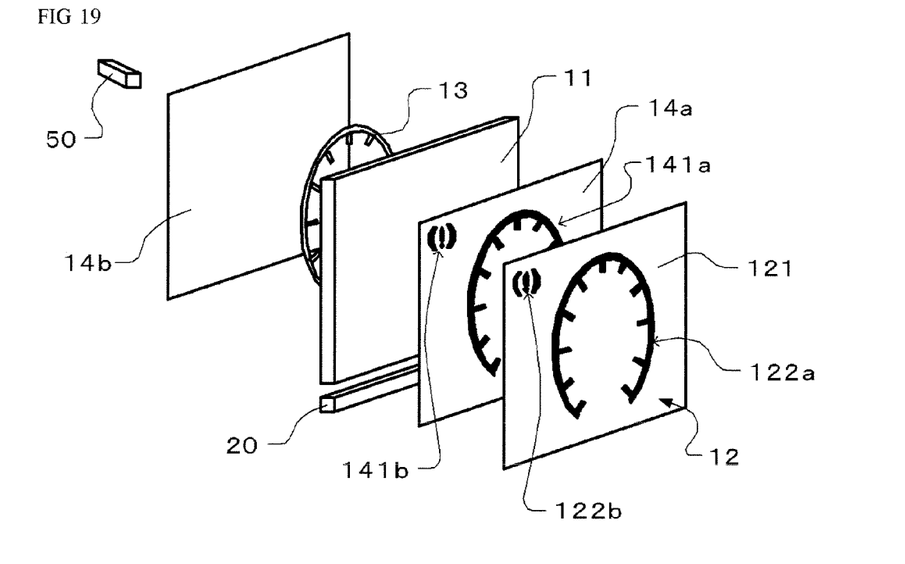
FIG. 19 is an exploded perspective view of a display device according to another modification of the present invention, which is provided with a design display portion having a second light transmissive outputting portion.
Figure 20:
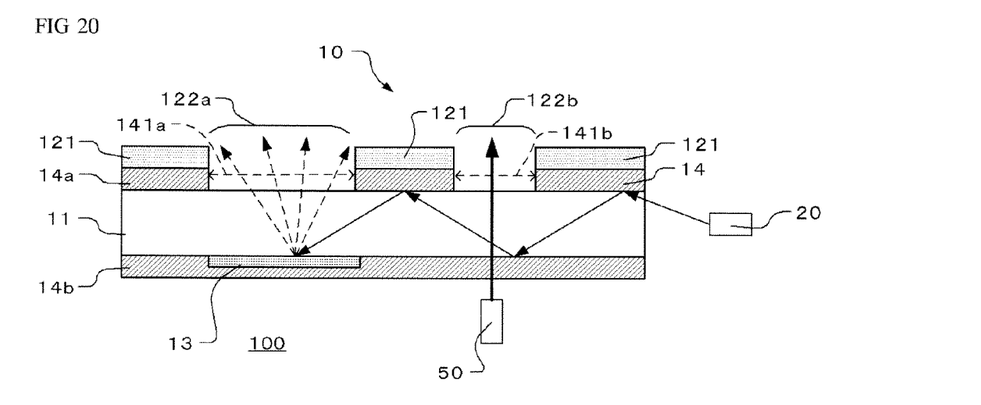
FIG. 20 is a schematic view of the display device illustrated in FIG. 19, which illustrates a path of light outputted respectively from a first light source and a second light source.

Furthermore, in addition to the configuration of the display device 100 in the embodiment, as illustrated in FIG. 19 and FIG. 20, the design display portion 12 may be provided with a second light transmissive outputting portion 122b (an alert portion) obtained by cutting out the "alert portion" from the design portion 121. Furthermore, an additional light source 50 (a second light source 50) separately from the first light source 20 may be provided at a side (the rear surface of the display member 10) of the rear surface 112 of the light guiding member 11 while facing the second light transmissive outputting portion 122b. The second light source 50 is arranged in an area overlapping the second light transmissive outputting portion 122b when viewed from the normal direction of the surface of an area where the second light transmissive outputting portion 122b is provided. In addition, the first low refractive index portion 14a is provided with a second notch portion 141b. However, the second notch portion 141b may not be formed.

Figure 21:
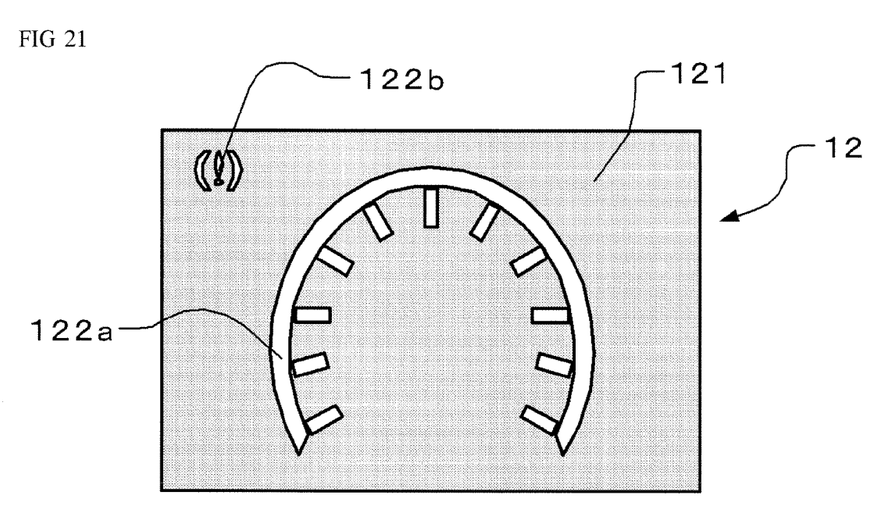
FIG. 21 is a diagram of the display device illustrated in FIG. 19, which illustrates a state in which light is outputted from the first light transmissive outputting portion and the second light transmissive outputting portion of the design display portion.

In the display device 100 configured as above, as illustrated in FIG. 20, light outputted from the second light source 50 passes through the second low refractive index portion 14b, the light guiding member 11, and the second through hole 141b, and then passes through the second light transmissive outputting portion 122b of the design display portion 12. In this way, as illustrated in FIG. 21, the design display portion 12 outputs the light spread by the light spreading portion 13 from the light transmissive outputting portion 122a, and further allows the light outputted from the second light source 50 to pass through the light transmissive outputting portion 122b (the alert portion). Since the light outputted from the light transmissive outputting portion 122b is the light directly outputted from the second light source 50 and is not spread or reflected, it is possible to output light with high luminance from the light transmissive outputting portion 122b. Consequently, since the light transmissive outputting portion 122b is brightly lightened, it is possible to attract the attention of a user.

INDUSTRIAL APPLICABILITY

The present invention is available for a display device that displays various types of information in a vehicle and the like.

REFERENCE SIGNS LIST

10 Display Member
11 Light Guiding Member
12 Design display portion
13 Light Spreading Portion
14a First Low Refractive Index Portion
14b Second Low Refractive Index Portion
20 First Light Source
50 Second Light Source
100 Display Device
111 Surface of Light Guiding Member
112 Rear Surface of Light Guiding Member
121 Design Portion
122,122a First Light Transmissive Outputting Portion
122b Second Light Transmissive Outputting Portion
131 High Refractive Index Portion
141 Through Hole
141a First Through Hole
141b Second Through Hole

The invention claimed is:

1. A display member comprising:
a light guiding member for guiding light outputted from a first light source;
a light spreading portion for spreading the light guided by the light guiding member, the light spreading portion being provided on at least one of a front surface and a rear surface of the light guiding member; and
a design display portion for displaying a design, the design display portion being provided on at least one of the front surface and the rear surface of the light guiding member, wherein:
the design display portion includes a first light transmissive outputting portion for transmitting and outputting the light spread by the light spreading portion,
the light spreading portion is provided to correspond to the first light transmissive outputting portion, and
the design display portion further includes a second light transmissive outputting portion provided in an area not corresponding to the light spreading portion, and transmitting and outputting light which has been outputted from a second light source and has passed through the light guiding member from the rear surface of the light guiding member.

2. The display member according to claim 1, wherein at least a part of the light spreading portion overlaps the first light transmissive outputting portion.

3. The display member according to claim 1, wherein the light spreading portion is larger than the first light transmissive outputting portion.

4. The display member according to claim 1, wherein
the light spreading portion comprises: a high refractive index portion having a refractive index of light higher than that of the light guiding member, and
the high refractive index portion is provided close to the surface of the light guiding member.

5. The display member according to claim 1, wherein
the light spreading portion is formed in a shape approximately equal to a shape of the first light transmissive outputting portion.

6. The display member according to claim 1, further comprising a low refractive index portion provided between the light guiding member and the design display portion and having a refractive index of light lower than that of the light guiding member.

7. The display member according to claim 6, wherein
the low refractive index portion interposes the light guiding member between both surfaces thereof.

8. A display device comprising:
a first light source;
a light guiding member for guiding light outputted from the first light source;
a light spreading portion for spreading the light guided by the light guiding member, the light spreading portion being provided on at least one of a surface and a rear surface of the light guiding member;
a design display portion for displaying a design, the design display portion being provided on at least one of the front surface and the rear surface of the light guiding member; and
a second light source, wherein:

the design display portion includes a first light transmissive outputting portion for transmitting and outputting the light spread by the light spreading portion, the light spreading portion is provided to correspond to the first light transmissive outputting portion; and the design display portion includes a second light transmissive outputting portion provided in an area not corresponding to the light spreading portion, and transmitting and outputting light which has been outputted from the second light source and has passed through the light guiding member from the rear surface of the light guiding member, and the second light source is provided at the rear surface of the light guiding member while facing the second light transmissive outputting portion.

* * * * *